United States Patent
Lee et al.

(10) Patent No.: US 10,055,630 B2
(45) Date of Patent: Aug. 21, 2018

(54) ELECTRONIC DEVICE WITH FINGERPRINT RECOGNITION CIRCUIT POWERED BY DEDICATED POWER SOURCE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 9 days.

(21) Appl. No.: 14/959,682

(22) Filed: Dec. 4, 2015

(65) Prior Publication Data

US 2016/0162721 A1    Jun. 9, 2016

(30) Foreign Application Priority Data

Dec. 5, 2014 (TW) .............................. 103142377 A (51) Int. Cl.
*G06K 9/00* (2006.01)

(52) U.S. Cl.
CPC .................. *G06K 9/0002* (2013.01)

(58) Field of Classification Search
CPC ............ G06K 9/0002; G06K 9/00013; G06K 9/0004; G06K 9/2027; G06F 3/044; G06F 1/189; G06F 1/26; G06F 3/0418; G06F 3/0412; G06F 3/0416; G06F 3/0421; H01L 27/323; H01L 27/3234

USPC .................................................. 382/124, 115
See application file for complete search history.

(56) References Cited

U.S. PATENT DOCUMENTS

| | | | | |
|---|---|---|---|---|
| 3,798,471 A * | 3/1974 | Williams | ............... | H03K 5/003 327/108 |
| 5,534,693 A * | 7/1996 | Kondo | ..................... | G01D 5/38 250/231.16 |
| 5,736,878 A * | 4/1998 | McLeod | ............... | G11C 27/026 327/94 |
| 7,864,992 B2 * | 1/2011 | Riedijk | ................ | G06K 9/0002 382/124 |

(Continued)

FOREIGN PATENT DOCUMENTS

| | | |
|---|---|---|
| CN | 204740677 U | * 11/2015 |
| CN | 204759622 U | * 11/2015 |

(Continued)

*Primary Examiner* — Mekonen Bekele
(74) *Attorney, Agent, or Firm* — Muncy, Geissler, Olds & Lowe, P.C.

(57) ABSTRACT

An electronic device with fingerprint recognition circuit powered by dedicated power source includes a functional circuit, a plurality of fingerprint sensing electrodes, and a fingerprint sensing control circuit. The functional circuit is powered by a first power source. The fingerprint sensing electrodes are provided for sensing a contact of a finger. The fingerprint sensing control circuit is powered by a second power source which is different from the first power source. The fingerprint sensing control circuit is connected to the fingerprint sensing electrodes for driving the fingerprint sensing electrodes to sense the fingerprint, wherein there is no common current loop between the first power source and the second power source during an operation of fingerprint sensing.

13 Claims, 10 Drawing Sheets

(56) References Cited

U.S. PATENT DOCUMENTS

| | | | | |
|---|---|---|---|---|
| 9,773,148 B2* | 9/2017 | Mo | ............... | G06K 9/0002 |
| 2004/0252867 A1* | 12/2004 | Lan | ............... | G06K 9/0004 |
| | | | | 382/124 |
| 2011/0175703 A1* | 7/2011 | Benkley, III | ....... | G06K 9/00053 |
| | | | | 340/5.82 |
| 2011/0273289 A1* | 11/2011 | Tong | ............... | G06F 3/021 |
| | | | | 340/540 |
| 2013/0314148 A1* | 11/2013 | Kang | ............ | G06K 9/0002 |
| | | | | 327/517 |
| 2014/0138735 A1* | 5/2014 | Clarke | ............ | H01L 29/0692 |
| | | | | 257/124 |
| 2014/0201827 A1* | 7/2014 | Okazaki | ............ | G06F 1/1616 |
| | | | | 726/7 |
| 2014/0361617 A1* | 12/2014 | Ohnuki | ............ | H02M 3/158 |
| | | | | 307/24 |
| 2015/0015537 A1* | 1/2015 | Riedijk | ............ | G06F 3/044 |
| | | | | 345/174 |
| 2015/0254491 A1* | 9/2015 | Mo | ............... | G06F 3/0416 |
| | | | | 345/174 |
| 2016/0162075 A1* | 6/2016 | Lee | ............ | G06F 3/044 |
| | | | | 345/174 |

FOREIGN PATENT DOCUMENTS

| | | | |
|---|---|---|---|
| CN | 204759623 U | * | 11/2015 |
| CN | 204759624 U | * | 11/2015 |

* cited by examiner

ELECTRONIC DEVICE WITH FINGERPRINT RECOGNITION CIRCUIT POWERED BY DEDICATED POWER SOURCE

BACKGROUND OF THE INVENTION

1. Field of the Invention

The present invention relates to the technical field of fingerprint recognitions and, more particularly, to an electronic device with fingerprint recognition circuit powered by dedicated power source.

2. Description of Related Art

With the development of electronic commences, remote payments are getting more and more popular and thus the requirement for biometrics is highly increased. The biometrics technology can be divided into fingerprint recognition, iris recognition, DNA recognition, and the like. For the efficient, safe, and non-intrusive considerations, the fingerprint recognition becomes the first selected technology.

In terms of the recognition principle, the fingerprint recognition can be classified into optical scanning, thermal image sensing, and capacitive sensing and, upon consideration of the cost, power-saving, reliability, and anti-counterfeit, the capacitive sensing is the outstanding one.

Typically, in terms of the recognition operation, the fingerprint recognition can be divided into the types of linear swiping scan and full area detection, wherein the full area detection is better due to its resolution, efficiency, and convenience. However, due to the factors that the sensing signal is very weak and the background noise is complicated and strong, the fingerprint recognition of full area detection is typically implemented by forming the sensor electrodes and the sensing circuit in one IC chip with a sapphire film having a thickness of smaller than 100 µm for protection. Such material cost and package cost are quite high. Accordingly, the manufacturing cost is extremely high, and the product's lifetime and tolerance are suspicious. Thus, the industry has attempted to increase the sensing sensitivity and the signal to noise ratio (SNR) for placing a fingerprint recognition sensing device beneath a protective glass, even into a display panel, so as to cost down and increase the product's lifetime and tolerance.

Figure 1A:
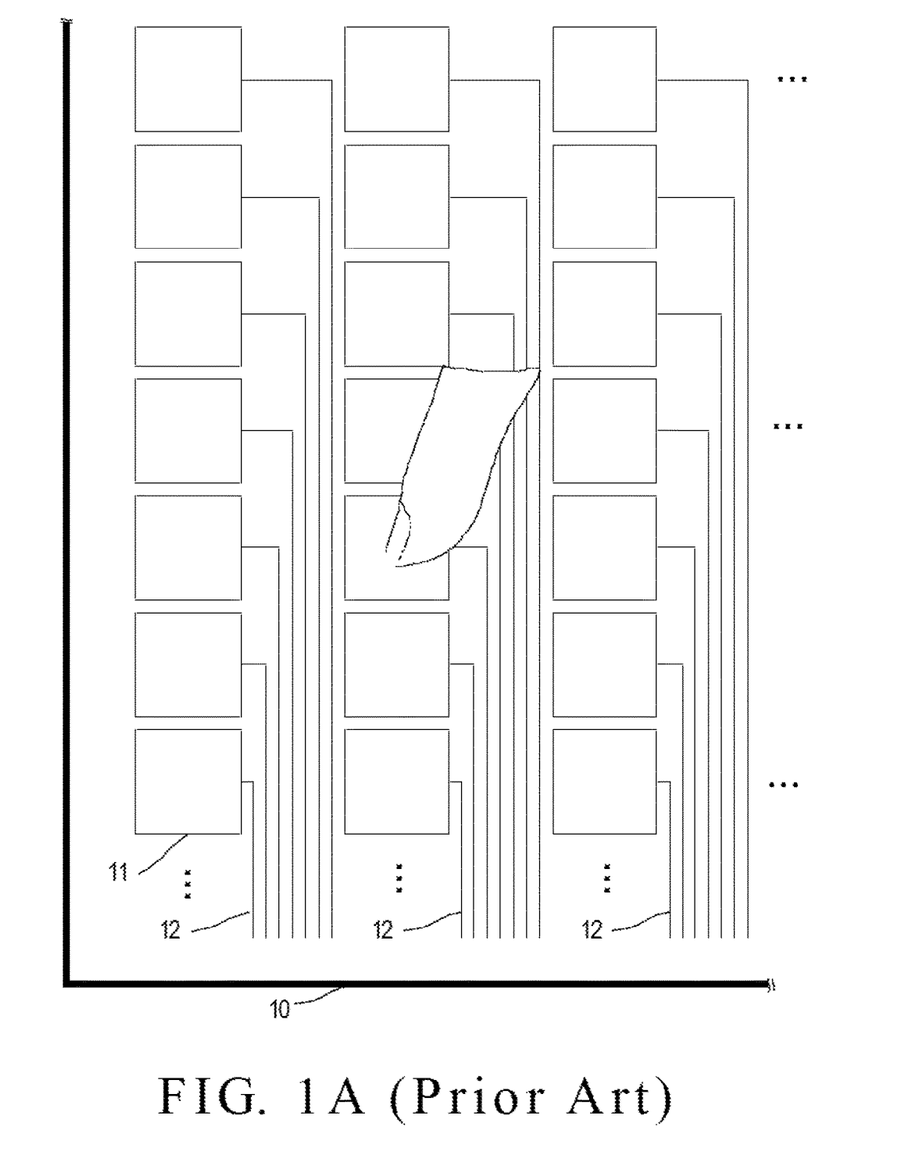
FIG. 1A is a schematic diagram of a typical capacitive fingerprint signal sensing.

FIG. 1A is a schematic diagram of a typical capacitive fingerprint signal sensing. As shown, a plurality of sensing electrodes 11 is disposed on a substrate 10 in columns and rows to perform a capacitance sensing, and the electrical signals sensed by the sensor electrodes 11 are transmitted through the corresponding conductive wires 12 for output, so as to obtain a fingerprint image. Such a single-layer transparent electrode structure can realize fingerprint recognition. In use, the single-layer transparent electrode structure of FIG. 1A is combined with a display panel. However, when the single-layer transparent electrode structure of fingerprint recognition is integrated to the inside of a display panel, there will be an obvious capacitance produced between the single-layer transparent electrode structure and a common voltage (Vcom) layer of the display panel, which may cause noises to be produced and thus lower the accuracy in fingerprint recognition. Therefore, it is known that the fingerprint recognition circuit is highly susceptible to noises, and accordingly its design has to avoid the noise interference as much as possible.

Figure 1B:
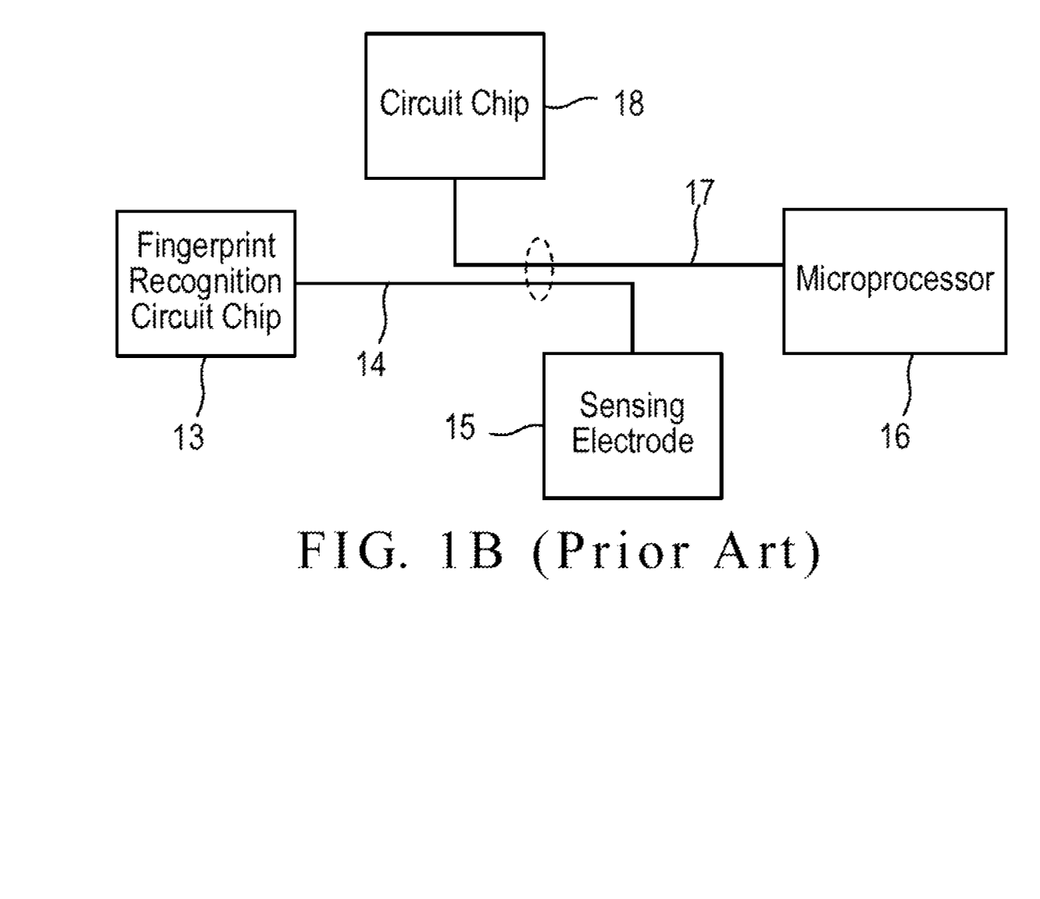
FIG. 1B is a schematic diagram illustrating how a fingerprint recognition circuit is interfered by noise.

FIG. 1B is a schematic diagram illustrating how a fingerprint recognition circuit is interfered by noise. As shown, in an electronic device such as a smart phone, a fingerprint recognition circuit chip 13 is connected to a sensor electrode 15 through a conductive wire 14 for sensing analog signal generated by a finger's touch. In addition, a microprocessor 16 in the electronic device is connected to another circuit chip 18 or the fingerprint recognition circuit chip 13 through a connection wire 17 in order to transmit digital signal for providing a corresponding function of the electronic device. Since the electronic devices tend to be compact, the conductive wire 14 and the connection wire 17 are typically very close to each other. Moreover, the fingerprint recognition circuit chip 13, the microprocessor 16, and the another circuit chip 18 in the electronic device are powered by a single battery power source. As a result, the analog signal of the conductive wire 14 is likely to be interfered by the control signal of the connection wire 17, resulting in an error on fingerprint recognition.

Therefore, it is desirable to provide an improved fingerprint recognition circuit to an electronic device to mitigate and/or obviate the aforementioned problems.

SUMMARY OF THE INVENTION

The object of the present invention is to provide an electronic device with fingerprint recognition circuit powered by dedicated power source, which can reduce the noise on the fingerprint recognition circuit and increase the accuracy of the fingerprint recognition circuit during an operation of fingerprint sensing.

To achieve the object, the present invention provides an electronic device with fingerprint recognition circuit powered by dedicated power source, which includes: a functional circuit powered by a first power source; a plurality of fingerprint sensing electrodes for sensing a contact of a finger; and a fingerprint sensing control circuit powered by a second power source which is different from the first power source, and connected to the plurality of fingerprint sensing electrodes for driving the plurality of fingerprint sensing electrodes so as to obtain a fingerprint image of the finger, wherein there is no common current loop between the first power source and the second power source during an operation of fingerprint sensing.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
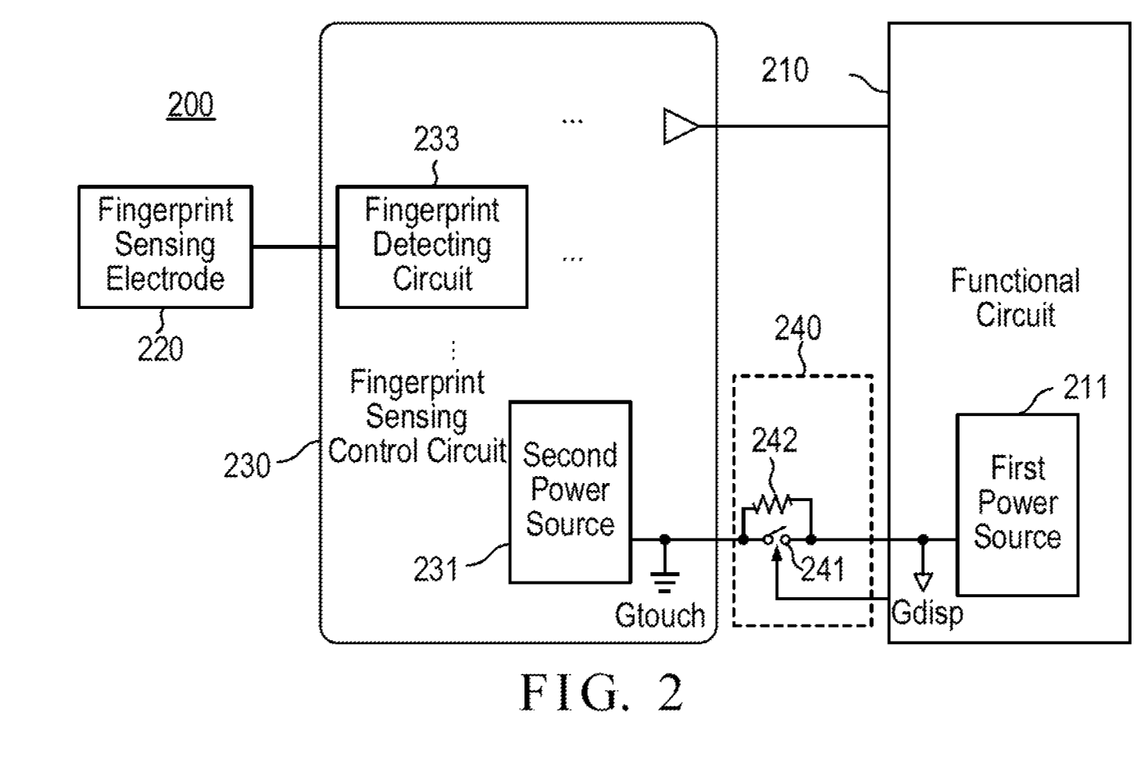
FIG. 2 is a schematic diagram of an electronic device 200 with fingerprint recognition circuit powered by dedicated power source according to a first embodiment of the present invention.

FIG. 2 is a schematic diagram of an electronic device 200 with fingerprint recognition circuit powered by dedicated power source according to a first embodiment of the present invention. As shown in FIG. 2, the electronic device 200 includes a functional circuit 210, a plurality of fingerprint sensing electrodes 220, a fingerprint sensing control circuit 230, and a switch device 240. The switch device 240 is a switch element 241 capable of switching its two terminals to be connected or disconnected. Alternatively, the switch device 240 may include the switch element 241 and a high impedance element 242 connected to the two terminals of the switch element 241. In this embodiment, the switch device 240 includes the switch element 241 and the high-impedance element 242 connected to the two terminals of the switching element 241.

The functional circuit 210 is a circuit to provide specific functions of the electronic device 200 and is powered by a first power source 211. The functional circuit 210 and the first power source 211 have a first grounding terminal referring to a first ground (Gdisp). The functional circuit 210 can be a display control circuit connected to a display unit (not shown) for controlling the display unit to display an image. In other embodiments, the functional circuit 21 can be an audiovisual equipment control circuit, a personal identity recognition system, a personal computer, a wearable electronic device circuit, an entrance guard control system, an electronic payment system, a vehicle control system, a navigation system, a traffic control circuit, a video game control circuit, or an activation enable control circuit of an equipment.

The fingerprint sensing electrodes 220 are provided for sensing the contact of a finger. In FIG. 2, only one fingerprint sensing electrode 220 is shown. However, in practical application, there is a plurality of fingerprint sensing electrodes 220 arranged on a substrate (not shown) in horizontal and vertical directions.

The fingerprint sensing control circuit 230 is powered by a second power source 231 which is different from the first power source 211. The fingerprint sensing control circuit 230 and the second power source 231 have a second grounding terminal referring to a second ground (Gtouch). The fingerprint sensing control circuit 230 is connected to the plurality of fingerprint sensing electrodes 220 for driving the fingerprint sensing electrodes 220 to perform fingerprint sensing. During an operation of fingerprint sensing, there is no common current loop between the first power source 211 and the second power source 231 or there is a current loop formed through a high impedance element. Optionally, the fingerprint sensing control circuit 230, the second power source 231 and the switch element 241 are implemented in an integrated circuit chip.

The fingerprint sensing control circuit 230 further includes a fingerprint detecting circuit 233 for detecting the fingerprint sensing signal of each of the fingerprint sensing electrodes 220.

The switch device 240 is connected between the grounding terminal of the first power source 211 and the grounding terminal of the second power source 231 for controlling the grounding terminal of the first power source 211 and the grounding terminal of the second power source 231 to be connected or disconnected. Namely, during the operation of the fingerprint sensing, the first power source 211 and the second power source 231 are disconnected, and thus there is no common current loop. During the operation exclusive of fingerprint sensing, the first power source 211 and the second power source 231 are connected, so as to have a common current loop.

The switch device 240 includes at least one switch element 241, which is preferably a transistor switch element. The switch device 240 may further include a high impedance element 242. The high impedance element 242 is connected to the switch element 241 in parallel for preventing an electrostatic voltage difference from being generated between the functional circuit 210 and the fingerprint sensing control circuit 230. The high impedance element 242 is a resistor with a resistance greater than 1MΩ. The functional circuit 210 controls the switch element 241 to be on or off In other embodiments, the fingerprint sensing control circuit 230 is employed to control the switch element 241 to be on or off.

Figure 3A:
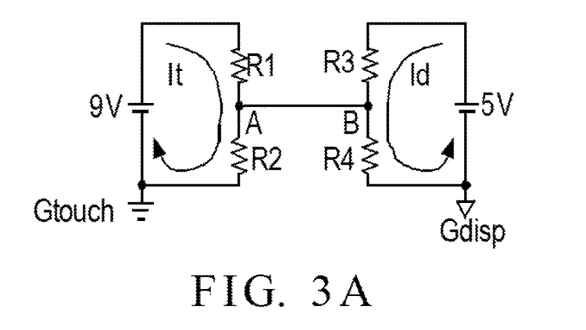
FIG. 3A is a schematic diagram illustrating the operation principle of the electronic device with fingerprint control circuit powered by dedicated power source according to the present invention.

FIG. 3A is a schematic diagram illustrating the operation principle of the electronic device 200 with fingerprint control circuit powered by dedicated power source according to the present invention. In FIG. 3A, the point A of the current loop circuit at the left side and the point B of the current loop circuit at the right side are connected together. Namely, there is only one common point (A/B) between the two circuits that have no common ground and no common power source, and in this case the point A can be regarded as same as the point B. As shown in FIG. 3A, the point A has a voltage of (9V*R2)/(R1+R2) relative to the second ground (Gtouch), and the point B has a voltage of (5V*R4)/(R3+R4) relative to the first ground (Gdisp). Accordingly, the 5V power source for the circuit at the right side does not influence the circuit at the left side, and the 9V power source for the circuit at the left side also does not influence the circuit at the right side.

Figure 3B:
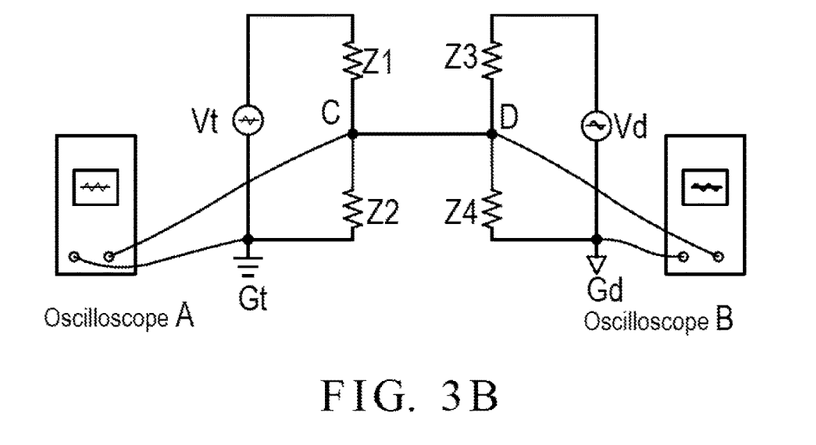
FIG. 3B is another schematic diagram illustrating the operation principle of the electronic device with fingerprint control circuit powered by dedicated power source according to the present invention.

FIG. 3B is another schematic diagram illustrating the operation principle of the electronic device 200 with fingerprint control circuit powered by dedicated power source according to the present invention. As shown in FIG. 3B, there is only one connection point (point C is the same as point D) between the left-side circuit and the right-side circuit that have no common ground. The left-side circuit has an AC signal source Vt, which is a triangle wave signal. The right-side circuit has another AC signal source Vd, which provides a sine wave signal. Since there is no common current loop between the left-side circuit and the right-side circuit, the oscilloscope (A) measures a triangle wave signal with an amplitude of (Vt*Z2)/(Z1+Z2) relative to the second grounding terminal Gt at the point C, which does not have any component of the sine wave signal source at the right side. Similarly, the oscilloscope (B) measures a sine wave signal with an amplitude of (Vd*Z4)/(Z3+Z4) relative to the first grounding terminal Gd at the point D, which does not have any component of the triangle wave signal source at the left side. Accordingly, the AC signals at the left side and the right side are not influenced to each other.

Figure 3C:
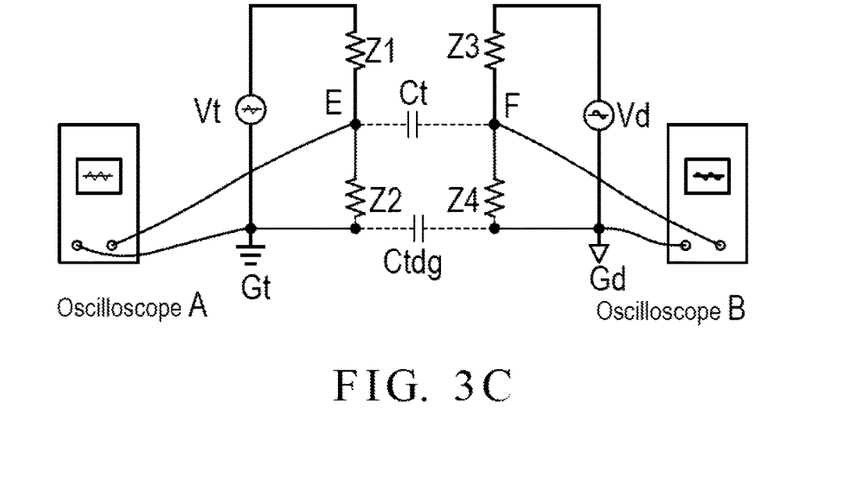
FIG. 3C is a further schematic diagram illustrating the operation principle of the electronic device with fingerprint control circuit powered by dedicated power source according to the present invention.

FIG. 3C is a further schematic diagram illustrating the operation principle of the electronic device 200 with fingerprint control circuit powered by dedicated power source according to the present invention. As shown in FIG. 3C, the left-side circuit and the right-side circuit have no common ground, no common current loop, and no connection, wherein Ct indicates a parasitic capacitance between point E of the left-side circuit and the point F of the right-side circuit, and Ctdg indicates a parasitic capacitance between the ground (second grounding terminal) of the left-side circuit and the ground (first grounding terminal) of the right-side circuit. The left-side circuit includes an AC signal source Vt, which is a triangle wave signal, and the right-side circuit includes an AC signal source Vd, which is a sine wave signal. When the Ctdg is very small, its impedance is almost infinite, so that the oscilloscope (A) measures a triangle wave signal with an amplitude of (Vt*Z2)/(Z1+Z2) relative to the second ground Gt at the point E, which does not have any component of the sine wave signal source at the right side. Similarly, the oscilloscope (B) measures a sine wave signal with an amplitude of (Vd*Z4)/(Z3+Z4) relative to the first grounding terminal Gd at the point F, which does not have any component of the triangle wave signal source at the left side. Accordingly, the AC signals at the left side and the right side are not influenced to each other.

In FIGS. 3B and 3C, the left-side and the right-side AC signal sources Vt and Vd respectively represent individual activation signals of two circuits without common current loop, and noises superimposed on the power sources of the two circuits, which can be a combination of various frequencies and waveforms. The triangle wave and sine wave in the figures are for illustrative purpose only, but not for a limit.

As shown in FIGS. 3A, 3B, and 3C, it is known that, when performing an operation of fingerprint sensing, the signal or noise on the functional circuit 210 dose not influence the fingerprint sensing control circuit 230 since there is no common current loop between the first power source 211 and the second power source 231. Therefore, the noise on the fingerprint sensing control circuit 230 can be reduced, so that the sensitivity and accuracy of the fingerprint sensing control circuit 230 is increased when performing the fingerprint sensing.

Figure 4:
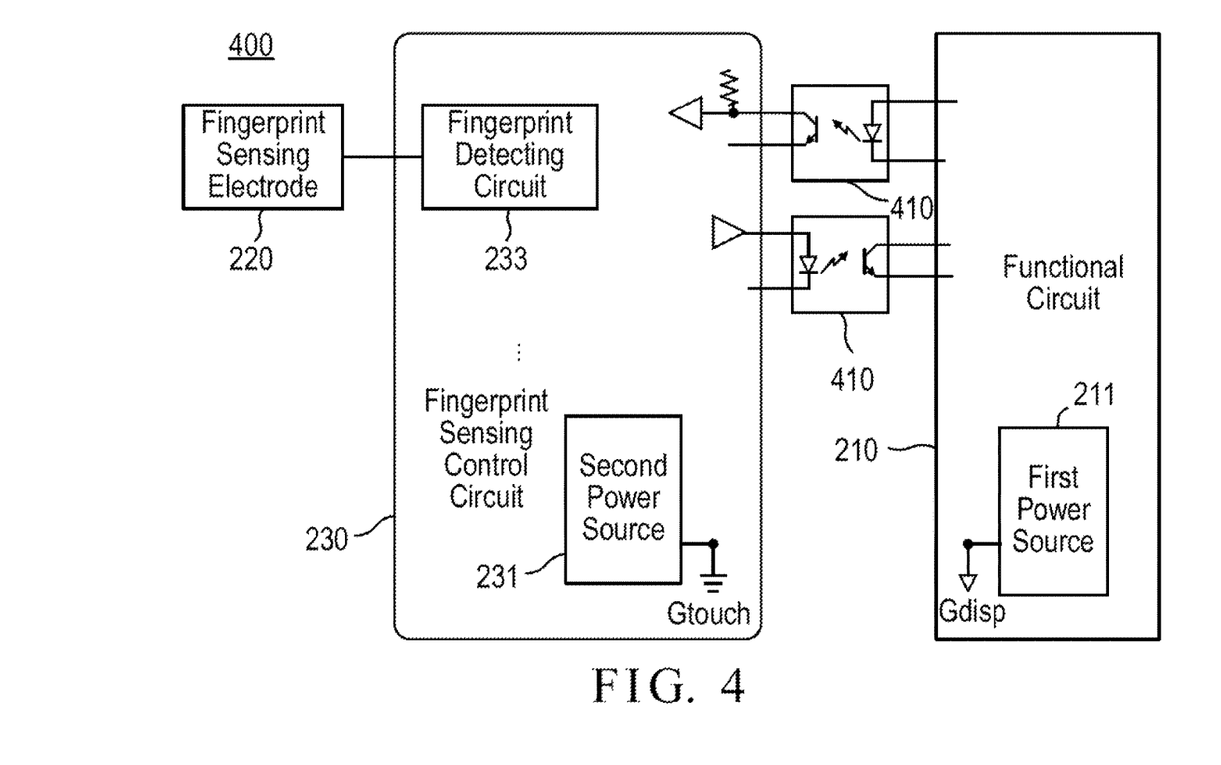
FIG. 4 is a schematic diagram of an electronic device with fingerprint control circuit powered by dedicated power source according to a second embodiment of the present invention.

FIG. 4 is a schematic diagram of an electronic device 400 with fingerprint control circuit powered by dedicated power source according to a second embodiment of the present invention. This embodiment is similar to that of FIG. 2 except that the at least one switch element 241 and the high impedance element 242 are removed and at least one optical coupling circuit 410 is added. The at least one optical coupling circuit 410 is disposed between the functional circuit 210 and the fingerprint sensing control circuit 230 for performing signal transmission therebetween. Optionally, the fingerprint sensing control circuit 230, the second power source 231 and the at least one optical coupling circuit 410 are implemented in an integrated circuit chip.

Figure 5:
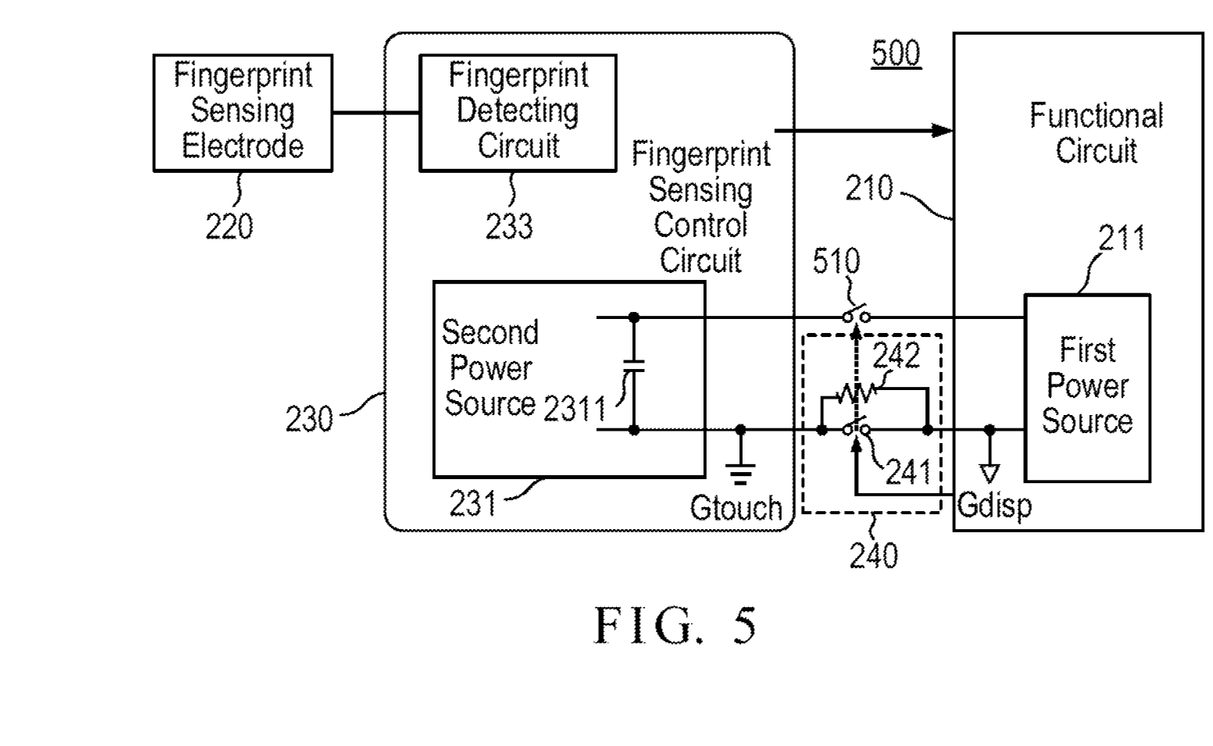
FIG. 5 is a schematic diagram of an electronic device with fingerprint control circuit powered by dedicated power source according to a third embodiment of the present invention.

FIG. 5 is a schematic diagram of an electronic device 500 with fingerprint control circuit powered by dedicated power source according to a third embodiment of the present invention. This embodiment is similar to that of FIG. 2 except that a power charging loop switch element 510 is added between the first power source 211 and the second power source 231. As a result, during the operation exclusive of fingerprint sensing, the power charging loop switch element 510 is switched on to allow the first power source 211 to charge a chargeable capacitor 2311 of the second power source 231. In this embodiment, the switch elements are switched on and off under the control of the functional circuit 210. In other embodiments, the switch elements can be switched on and off under the control of the fingerprint sensing control circuit 230. Optionally, the fingerprint sensing control circuit 230, the second power source 231 and the power charging loop switch element 510 are implemented in an integrated circuit chip.

Figure 6:
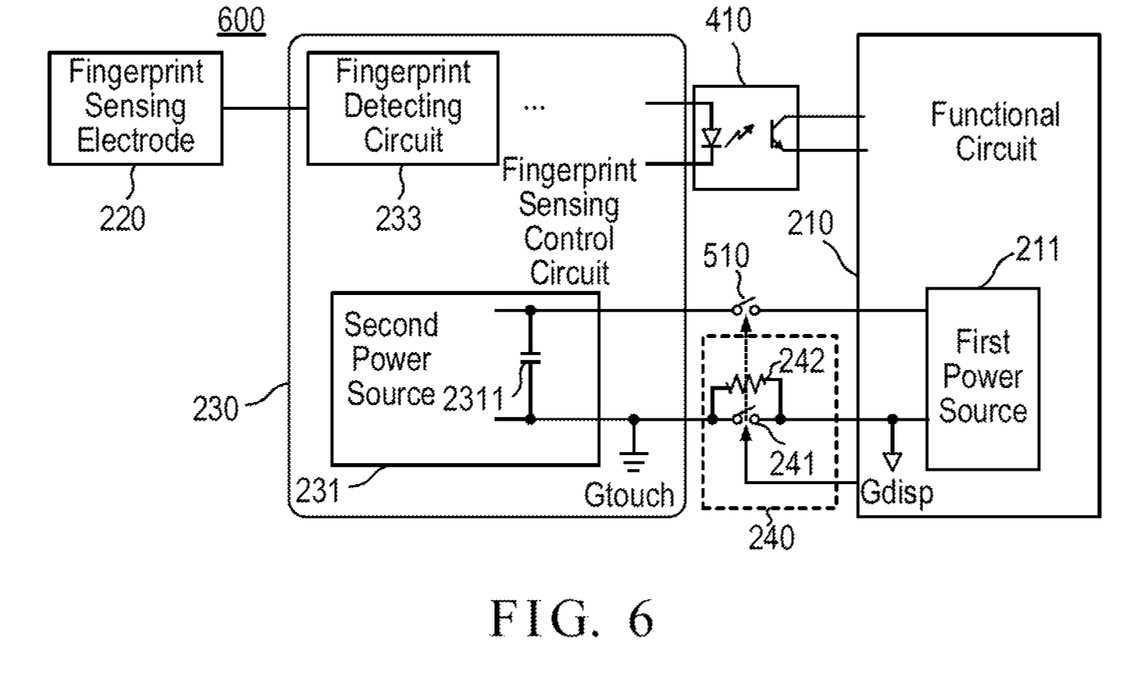
FIG. 6 is a schematic diagram of an electronic device with fingerprint control circuit powered by dedicated power source according to a fourth embodiment of the present invention.

FIG. 6 is a schematic diagram of an electronic device 600 with fingerprint control circuit powered by dedicated power source according to a fourth embodiment of the present invention. This embodiment is similar to that of FIG. 5 except that at least one optical coupling circuit 410 is added. The optical coupling circuit 410 is disposed between the functional circuit 210 and the fingerprint sensing control circuit 230 for performing signal transmission therebetween.

Figure 7:
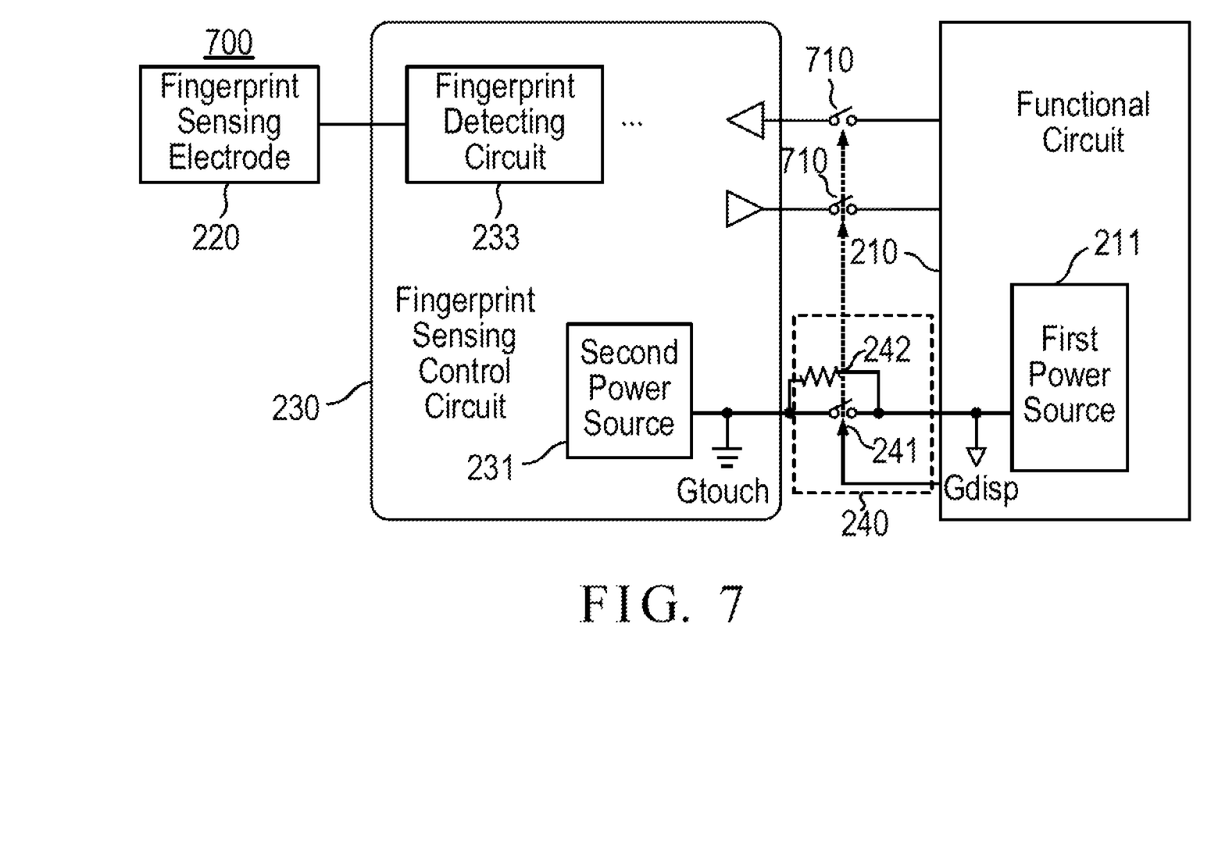
FIG. 7 is a schematic diagram of an electronic device with fingerprint control circuit powered by dedicated power source according to a fifth embodiment of the present invention.

FIG. 7 is a schematic diagram of an electronic device 700 with fingerprint control circuit powered by dedicated power source according to a fifth embodiment of the present invention. This embodiment is similar to that of FIG. 2 except that at least one data transmission switch element 710 is added. The at least one data transmission switch element 710 is disposed between the fingerprint sensing control circuit 230 and the functional circuit 210. As a result, during the operation exclusive of fingerprint sensing, the at least one data transmission switch element 710 is switched on to allow a data transmission between the fingerprint sensing control circuit 230 and the functional circuit 210. In this embodiment, the switch elements are switched on and off under the control of the functional circuit 210. In other embodiments, the switch elements can be switched on and off under the control of the fingerprint sensing control circuit 230. Optionally, the fingerprint sensing control circuit 230, the second power source 231 and the at least one data transmission switch element 710 are implemented in an integrated circuit chip.

Figure 8:
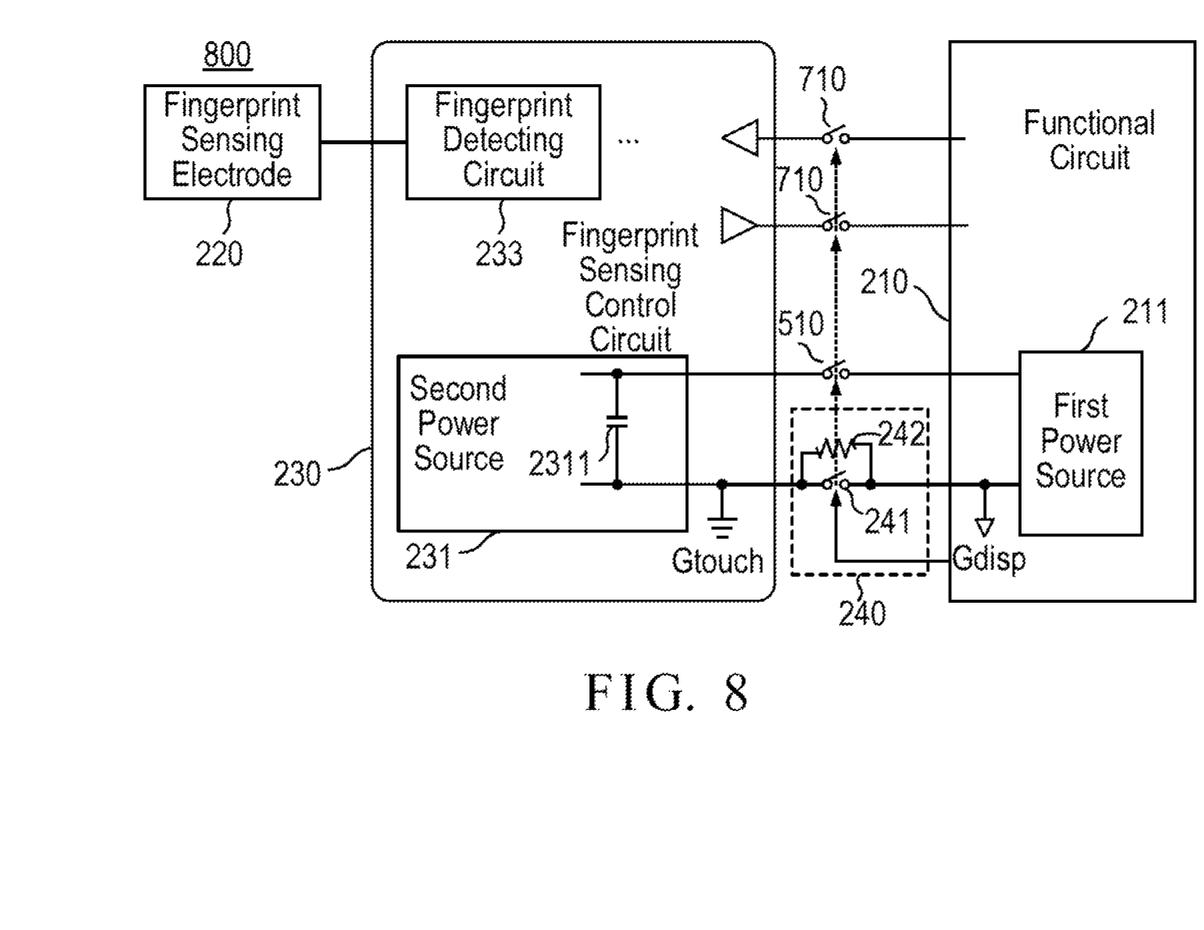
FIG. 8 is a schematic diagram of an electronic device with fingerprint control circuit powered by dedicated power source according to a sixth embodiment of the present invention.

FIG. 8 is a schematic diagram of an electronic device 800 with fingerprint control circuit powered by dedicated power source according to a sixth embodiment of the present invention. This embodiment is similar to that of FIG. 6 except that the at least one optical coupling circuit 410 is removed and at least one data transmission switch element 710 is added. The at least one data transmission switch element 710 is disposed between the fingerprint sensing control circuit 230 and the functional circuit 210. As a result, during the operation exclusive of the fingerprint sensing, the at least one data transmission switch element 710 is switched on to allow a data transmission between the fingerprint sensing control circuit 230 and the functional circuit 210. In this embodiment, the switch elements are switched on and off under the control of the functional circuit 210. In other embodiments, the switch elements can be switched on and off under the control of the fingerprint sensing control circuit 230.

Figure 9:
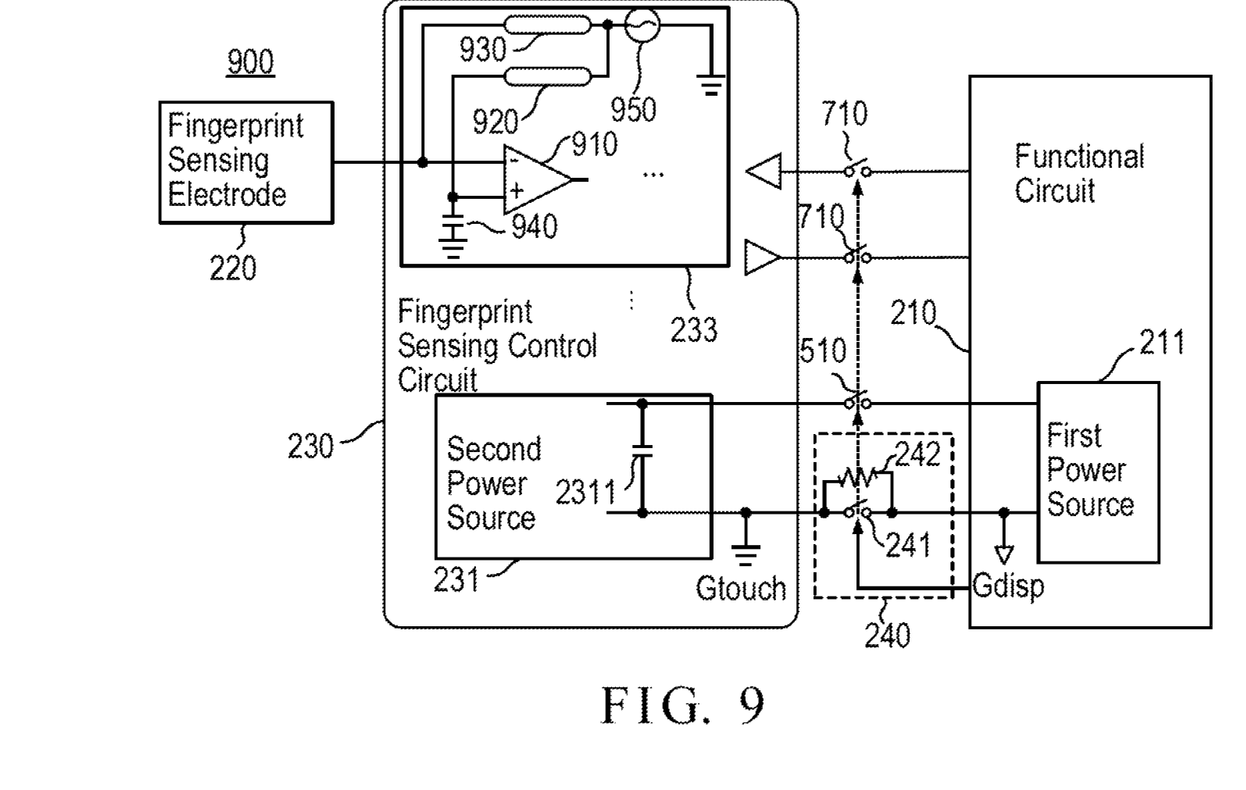
FIG. 9 is a schematic diagram of an electronic device with fingerprint control circuit powered by dedicated power source according to a seventh embodiment of the present invention.

FIG. 9 is a schematic diagram of an electronic device 900 with fingerprint control circuit powered by dedicated power source according to a seventh embodiment of the present invention. This embodiment depicts a detailed circuit of the fingerprint detecting circuit 233 in FIG. 8. As shown in FIG. 9, the fingerprint detecting circuit 233 includes a differential amplifier 910, a first impedance element 920, a second impedance element 930, a first capacitor 940, and a signal source 950. The fingerprint detecting circuit in FIG. 9 is a known as a self-capacitance sensing circuit. The technique of self-capacitance sensing mode in FIG. 9 is known to those skilled in the art by referencing to, for example, U.S. Pat. No. 8,704,539 granted to Lee, et al. for a "Minute impedance variation detection device".

In view of the foregoing, it is known that, in the present invention, there is no common current loop between the first power source 211 and the second power source 231 during the operation of fingerprint sensing, such that the signal or noise on the functional circuit 210 does not influence the fingerprint sensing control circuit 230, so that the noise on the fingerprint sensing control circuit 230 is reduced. Thus, the accuracy of the fingerprint sensing control circuit 230 can be increased when performing the fingerprint sensing.

Although the present invention has been explained in relation to its preferred embodiment, it is to be understood that many other possible modifications and variations can be made without departing from the spirit and scope of the invention as hereinafter claimed.

What is claimed is:

1. An electronic device with fingerprint recognition circuit powered by dedicated power source, comprising:
    a display control circuit powered by a first power source circuit and connected to a display unit for controlling the display unit to display an image;
    a plurality of fingerprint sensing electrodes to perform capacitive sense technology for sensing a fingerprint image of a contact finger;
    a fingerprint sensing control circuit powered by a second power source which is independent and different from the first power source, and connected to the plurality of fingerprint sensing electrodes for driving the plurality of fingerprint sensing electrodes so as to obtain a fingerprint image of the finger; and
    a switch device connected between the first power source and the second power source for being switched on and off under control of the fingerprint sensing control circuit or under control of the display control circuit, wherein the switch device is switched off so that there is no common current loop between the first power source and the second power source during an operation of fingerprint sensing and is switched on so that there is a common current loop between the first power source and the second power source during an operation of image displaying without fingerprint sensing.

2. The electronic device with fingerprint recognition circuit powered by dedicated power source as claimed in claim 1, wherein the first power source and the second power source are disconnected from each other during the operation of finger print sensing so that there is no common current loop therebetween.

3. The electronic device with fingerprint recognition circuit powered by dedicated power source as claimed in claim 2, wherein the first power source and the second power source are connected to each other during the operation of image displaying without fingerprint sensing so that there is a common current loop therebetween.

4. The electronic device with fingerprint recognition circuit powered by dedicated power source as claimed in claim 3, wherein the switch device is connected between a grounding terminal of the first power source and a grounding terminal of the second power source for controlling the grounding terminal of the first power source and the grounding terminal of the second power source to be disconnected or connected.

5. The electronic device with fingerprint recognition circuit powered by dedicated power source as claimed in claim 4, wherein the switch device is a transistor switch element.

6. The electronic device with fingerprint recognition circuit powered by dedicated power source as claimed in claim 5, wherein the fingerprint sensing control circuit, the second power source, and the switch device are implemented in an integrated circuit chip.

7. The electronic device with fingerprint recognition circuit powered by dedicated power source as claimed in claim 4, further comprising a high impedance element connected in parallel with the switch device.

8. The electronic device with fingerprint recognition circuit powered by dedicated power source as claimed in claim 1, further comprising at least one optical coupling circuit disposed between the display control circuit and the fingerprint sensing control circuit for performing signal transmission therebetween.

9. The electronic device with fingerprint recognition circuit powered by dedicated power source as claimed in claim 8, wherein the fingerprint sensing control circuit, the second power source, and the at least one optical coupling circuit are implemented in an integrated circuit chip.

10. The electronic device with fingerprint recognition circuit powered by dedicated power source as claimed in claim 1, further comprising a power charging loop switch element disposed between the first power source and the second power source, such that, during the operation of image displaying without fingerprint sensing, the power charging loop switch element is switched on to allow the first power source to charge the second power source.

11. The electronic device with fingerprint recognition circuit powered by dedicated power source as claimed in claim 10, wherein the fingerprint sensing control circuit, the second power source, and the power charging loop switch element are implemented in an integrated circuit chip.

12. The electronic device with fingerprint recognition circuit powered by dedicated power source as claimed in claim 1, further comprising at least one data transmission switch element disposed between the fingerprint sensing control circuit and the display control circuit, such that, during the operation of image displaying without fingerprint sensing, the at least one data transmission switch element is switched on to allow a data transmission between the fingerprint sensing control circuit and the display control circuit.

13. The electronic device with fingerprint recognition circuit powered by dedicated power source as claimed in claim 12, wherein the fingerprint sensing control circuit, the second power source, and the at least one data transmission switch element are implemented in an integrated circuit chip.

* * * * *